Oct. 10, 1944.  J. S. EDWARDS  2,359,978
STEERING MEANS FOR VEHICLES
Filed Sept. 2, 1943  2 Sheets-Sheet 1
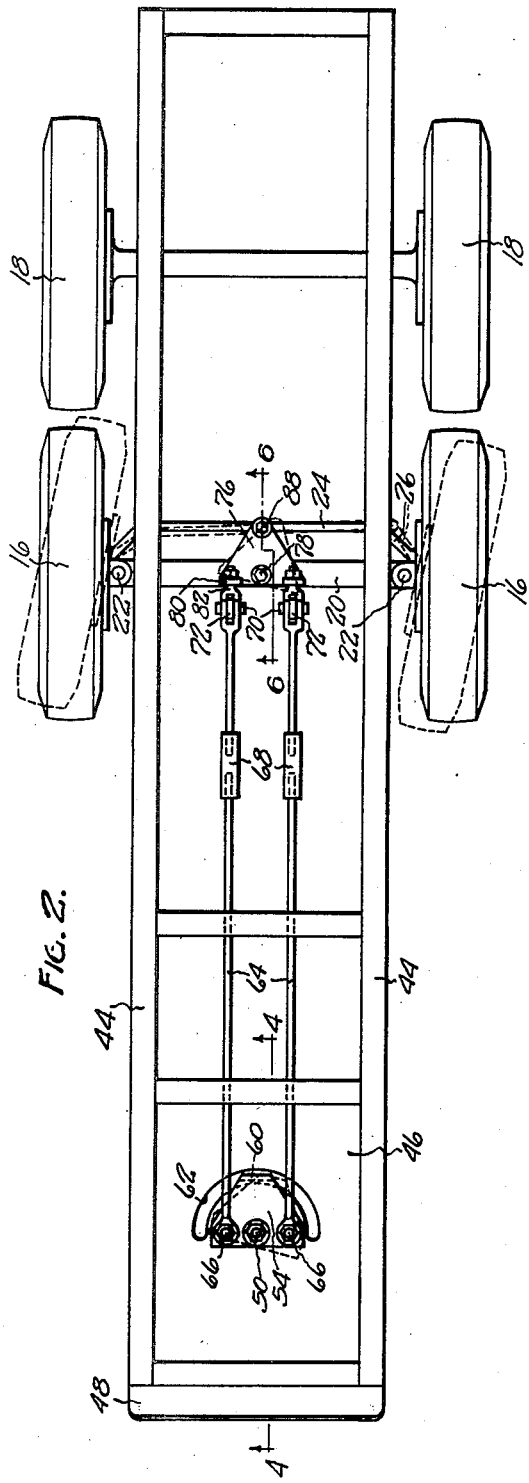
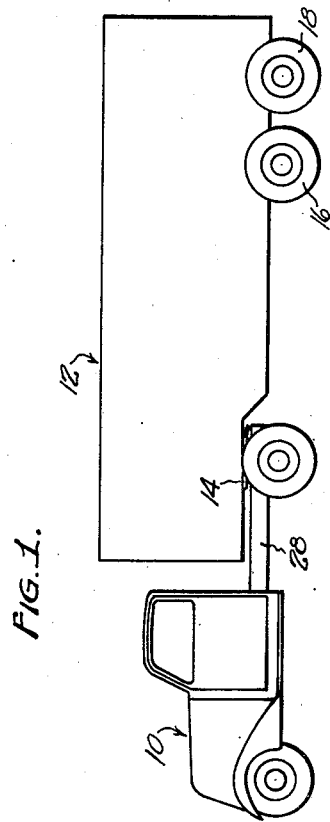
INVENTOR.
JOHN S. EDWARDS.
BY
 Altach & Knoblock
  Attorneys.

Oct. 10, 1944.  J. S. EDWARDS  2,359,978
STEERING MEANS FOR VEHICLES
Filed Sept. 2, 1943  2 Sheets-Sheet 2
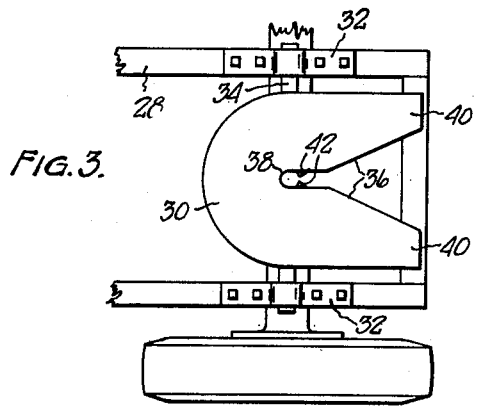
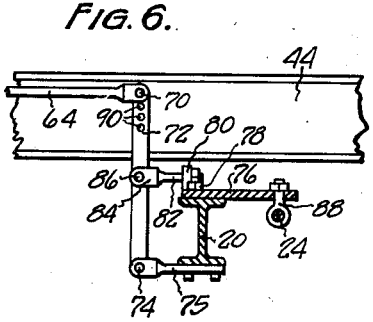
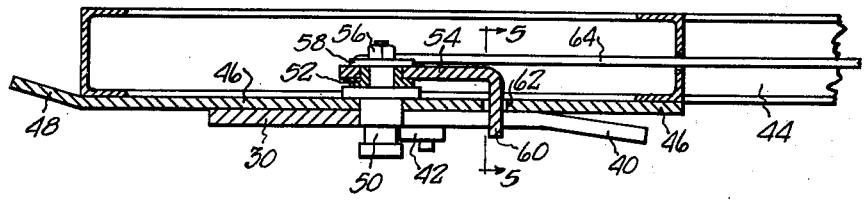
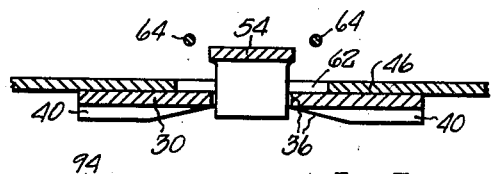
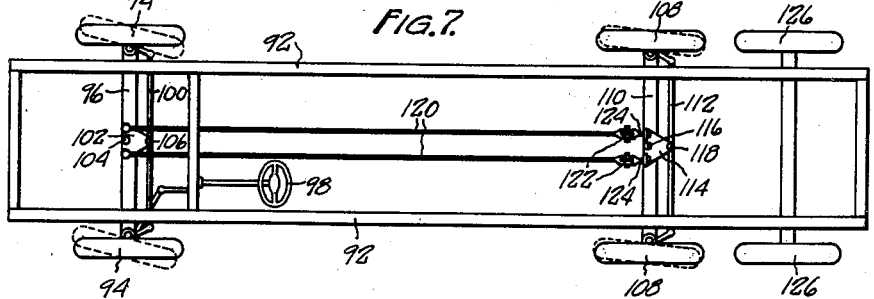
INVENTOR.
JOHN S. EDWARDS.
BY
Altsch & Knoblock
Attorneys.

Patented Oct. 10, 1944

2,359,978

UNITED STATES PATENT OFFICE 2,359,978

STEERING MEANS FOR VEHICLES

John S. Edwards, St. Joseph, Ind.

Application September 2, 1943, Serial No. 500,886

3 Claims. (Cl. 280—33.1)

This invention relates to steering means for vehicles, and more particularly to vehicles having multiple sets of rear wheels arranged in tandem.

Vehicles such as trucks and trailers, having tandem sets of rear wheels have great stresses applied to said tandem wheels each time the vehicle is turned. This stress results from the multiple longitudinally spaced points or areas of engagement of said tandem rear wheels with the ground, and is of such character that the forward set of tandem wheels tends to slide laterally in the direction of the turn and the trailing set of tandem wheels tends to slide laterally in the opposite direction. The stress entails scraping of the tires on the pavement, with resultant rapid wear and short life thereof; and also entails great distorting action on the wheels and at bearings and mechanical connections of parts. The stress experienced varies or increases as the turning radius decreases. Consequently, conventional vehicles having tandem rear axles may be considered to have a large turning radius as compared to conventional four-wheeled vehicles. This restricts the usefulness of the tandem wheeled vehicle, since it cannot be manipulated easily and quickly in small spaces which are frequently encountered at loading docks in crowded city industrial districts. Various expedients have been attempted to alleviate or remedy these conditions, but to my knowledge, none thereof has proven successful.

It is the primary object of my invention to provide a vehicle having a dirigible and a non-dirigible set of rear wheels arranged in tandem, and means for turning said dirigible wheels.

A further object is to provide a vehicle having means for steering the same at the front thereof, tandem sets of rear wheels including a dirigible set, and means controlled by said steering means for turning said dirigible set of rear wheels in proportion to the position thereof longitudinally of said vehicle relative to said steering means and the other set of rear wheels.

A further object is to provide a trailer adapted to be detachably connected to a tractor by means of a fifth-wheel unit, with a set of steerable wheels and means controlled by said fifth wheel for controlling said steerable wheels.

A further object is to provide a fifth wheel unit for detachably connecting two vehicles and including a pair of engageable fifth wheel plates having a king pin and a king pin receiving socket and slot respectively, with a member pivotally mounted on the plate mounting said king pin and having a projection fitting in said slot to be pivoted upon relative rotation of one plate relative to the other, said member being adapted to control dirigible wheels of the trailing vehicle.

Other objects will be apparent from description, drawings and appended claims.

In the drawings:

Fig. 1 is a side view of a tractor and a tandem-wheeled trailer connected by a fifth-wheel unit.

Fig. 2 is a skeleton top plan view illustrating the chassis of a trailer having dirigible and non-dirigible sets of wheels arranged in tandem, and means for controlling said dirigible set of wheels.

Fig. 3 is fragmentary top plan view of the chassis of a tractor mounting a fifth-wheel plate.

Fig. 4 is an enlarged longitudinal vertical detail sectional view taken on line 4—4 of Fig. 2, and illustrating the relation between said fifth-wheel unit and steering means.

Fig. 5 is an enlarged transverse vertical detail sectional view taken on line 5—5 of Fig. 4.

Fig. 6 is an enlarged longitudinal detail sectional view taken on line 6—6 of Fig. 2.

Fig. 7 is a skeleton top plan view of the chassis of a motor vehicle having tandem rear wheels and means for steering one set of said tandem wheels.

Referring to the drawings, and particularly to Figs. 1 to 6 thereof, the numeral 10 designates a tractor and numeral 12 designates a semi-trailer adapted to be connected to the tractor by a conventional fifth-wheel unit 14. The trailer 12 has two sets of wheels arranged in tandem to support the rear of the trailer, one set 16 of wheels being dirigible and the other set 18 being nondirigible. The wheels 16 are mounted in any conventional manner, as upon an axle 20 to which the wheels are pivoted at 22 about vertical axes, and are connected by means of a tie rod 24 pivoted to the ends of steering knuckle arms 26 carried by the individual wheel units.

The chassis 28 of tractor 10 mounts a lower fifth wheel plate 30 by means of brackets 32 which journal a shaft 34 extending transversely of said chassis and tiltably supporting plate 30. The plate 30 has an inwardly tapering longitudinal slot or throat 36 terminating in a central socket opening 38. The slot 36 defines a pair of rearwardly projecting portions 40 whose terminal portions are bent downwardly at an angle to the plane of plate 30. Suitable locking members 42 are carried by plate 30 to define and close the rear portion of socket opening 38.

The chassis 44 of trailer 12 mounts an upper fifth wheel plate 46 at the front thereof, which may include a portion 48 projecting forwardly from said chassis and bent upwardly out of the plane of said plate. Plate 46 fixedly mounts king pin 50 which projects downwardly therefrom and is adapted to be received in socket opening 38 and held therein by locking members 42. The upper end of king pin 50 preferably projects above plate 46 and mounts a bearing sleeve 52 upon which a horizontal member 54 is pivoted. Member 54 is held in place by any suitable means such as nut 56 threaded on the king pin and bearing on washer 58. Member 54 is preferably of substantially triangular form having its front edge transverse of the trailer chassis and having a downward projection 60 at its rear apex portion. Fifth wheel plate 46 has a substantially semi-circular slot 62 formed therein concentric with king pin 50 through which projection 62 extends freely to terminate in spaced relation below the bottom bearing face of fifth wheel plate 46.

A pair of elongated longitudinal rods 64 are pivotally connected at their forward ends at 66 to the opposite sides of pivoted member 54, preferably in equi-spaced relation to and in diametrically opposed relation to king pin 50. Rods 64 may be of sectional character, with the sections connected by adjustment member 68, such as a turnbuckle. The rear ends of rods 64 may be of forked construction for pivotal connection of each at 70 with the upper free end portion of one of a pair of upright levers 72, each pivoted at 74 at its lower end to a bracket 75 which is fixedly secured to the underside of axle 20 and which projects forwardly from said axle to permit tilting of said levers about axes parallel to said axle without interference from said axle. A horizontal member 76 is pivoted at 78 to the upper side of axle 20. Member 76 is preferably of substantially triangular form with its front edge extending substantially parallel to axle 20, and has a pair of rigid upwardly projecting ears 80 in equi-spaced relation to and on opposite sides of pivot 78. Each arm 80 has a longitudinally forwardly extending link 82 connected thereto, each of said links terminating in a front yoke portion 84 pivoted to an intermediate portion of adjacent lever 72 at 86. The rear portion of member 76 terminates adjacent tie rod 24 and pivotally mounts a connecting member 88 which is fixedly secured to said tie rod.

In the operation of the device above described, assuming that the tractor and trailer have been operatively connected by the fifth wheel unit, it will be apparent that upon any turning movement of the tractor there will be rotation of the lower fifth wheel plate 30 relative to upper fifth wheel plate 46 about the king pin 50 as a center. This relative rotation will bear a predetermined relation to the sharpness of the turn being made by the tractor. Thus, when the downward projection 60 of pivoted member 54 on the trailer fits snugly in the slot or throat 36 of lower fifth wheel plate 30, said relative rotation produces a like concentric rotation of member 54 relative to upper fifth wheel plate 46, accommodated by semi-circular opening 62 in upper plate 46. The rotation of member 54 pulls one of the rods 64 forwardly and pushes the other rod rearwardly, to tilt the levers 72 about their pivots 74 and rotate member 76 about its pivot point 78 by means of links 82. Rotation of member 76 imparts to tie rod 24 a movement longitudinally of said rod, which acts through steering knuckle arms 26 to turn the dirigible wheels 16. The extent or angle of rotation of member 76 is less than that of member 54, and the relation or proportion of the angles of rotation of these two connected parts depends upon the spacing of the pivot point 86 from pivot points 70 and 24 of lever 72. Adjustment of these pivot points may be provided in any convenient or suitable manner, as by providing the levers 72 with a plurality of longitudinally spaced apertures 90 at which the rods 64 and links 82 may be selectively connected. Preferably, the proportion existing between the angles of rotation of members 54 and 76 will be substantially the same as the ratio of the longitudinal distance between the king pin 50 and the steering knuckle axis 22 to the longitudinal distance or wheel base between wheels 16 and 18. Such a proportion will result in turning of wheels 16 the correct amount to avoid lateral stresses upon the tandem wheels as mentioned above. Proportional turning of one set of tandem rear wheels substantially reduces the turning axis of the vehicle.

An important advantage of the device above described is that it requires little change in the construction of a conventional fifth wheel unit, does not interfere with the normal operation of the fifth wheel unit to connect and disconnect the tractor and trailer, and is automatically conditioned for operation by the act of connecting the tractor and trailer at the fifth wheel. Thus, when a tractor is backed up to a trailer in the conventional manner to couple the vehicles at the fifth wheel unit, both the king pin 50 and depending projection 60 of member 54 will enter the slot or throat 36 of the lower fifth wheel plate, and when the king pin seats at socket 38 and is locked therein by members 42, the projection 60 will have the required fit in said slot to render it responsive to subsequent relative rotation of the fifth wheel plates. The tapering shape of slot or throat 36 will accommodate a limited range of disalignment of parts, as in the event wheels 16 are turned when the connection is being made, or in the event the tractor is not longitudinally aligned with the trailer, when the connection is being effected. The degree of disalignment which may be accommodated is limited to a greater degree than in effecting a connection at a king pin in a conventional unit, but this is not a serious disadvantage and can be met by preadjusting the angular position of member 54 in those cases where lack of space may require connection of tractor and trailer in disalignment.

Still another important advantage of the invention is that it greatly increases the control of the tractor-trailer unit by the driver, and also tends to prevent "jack-knifing" of the tractor-trailer unit.

It will be understood that the construction herein illustrated and described is illustrative and not limiting, and that various types of devices may be employed to effect actuation of control means responsive to relative rotation of fifth wheel plates and to operate therefrom actuating means for the dirigible set of tandem wheels. Also, the apparatus may be employed with a vehicle construction wherein the trailing set of tandem wheels is dirigible, or wherein more than two sets of wheels are arranged in tandem and all but one set thereof are dirigible.

The invention is also applicable to vehicles having six or more wheels, as illustrated in Fig. 7. In this construction the vehicle chassis 92 is supported by front wheels 94 mounted on axle 96 by conventional steering knuckles and controlled by conventional steering means including steering wheel 98 and tie rod 100. A member 102 may be pivoted to axle 98 at 104 and pivotally connected with tie rod 100 at 106 to be rotated about pivot point 104 upon turning movement of the steering mechanism. One set of rear wheels 108 may be mounted by conventional steering knuckles upon axle 110 and interconnected by steering arms and tie rod 112. A horizontal member 114 may be pivoted on axle 110 at 116 and pivotally connected at tie rod 112 at 118. Elongated rods 120 may be pivotally connected to member 102 at opposite sides thereof, and pivotally connected at their opposite ends to vertical levers 122 suitably pivoted relative to axle 110. Levers 122 may be connected to member 114 by links 124. The other set of rear vehicle wheels 126 may be non-dirigibly connected to chassis 92.

This construction operates to turn the dirigible set 108 of tandem wheels upon operation of the vehicle steering mechanism in substantially the same manner as above described, as will be obvious, and is also intended to be illustrative and not limiting.

I claim:

1. In combination, a fifth wheel comprising a pair of plates adapted for face engagement, one of said plates mounting a king pin and having an arcuate slot therein concentric with said pin, the other plate having a pair of spaced projecting portions and a central pin-receiving socket, and a member journaled on said king pin and having a vertical portion projecting through said slot and receivable between the projecting portions of said second plate to be rotated relative to said first plate upon relative rotation of said first and second plates.

2. In combination, a fifth wheel comprising upper and lower plates, said upper plate mounting a king pin, said lower plate having a central pin-receiving socket and a slot communicating with said socket and open at one end, and a member journaled on said pin and having a projecting portion fitting in said slot to rotate said member on said pin upon relative rotation of said plates.

3. In combination, a fifth wheel comprising upper and lower plates, said upper plate mounting a king pin and having an arcuate slot concentric with said pin, said lower plate being substantially U-shaped and having a central pin-receiving socket, a member journaled on said pin above said upper plate and having a rigid depending portion extending through said slot and between the opposite portions of said U-shaped lower plate to be rotated relative to said upper plate by said lower plate upon relative rotation of said plates.

JOHN S. EDWARDS.